(No Model.) 3 Sheets—Sheet 1.
E. W. DAILY.
HAY LOADER.
No. 507,109. Patented Oct. 24, 1893.
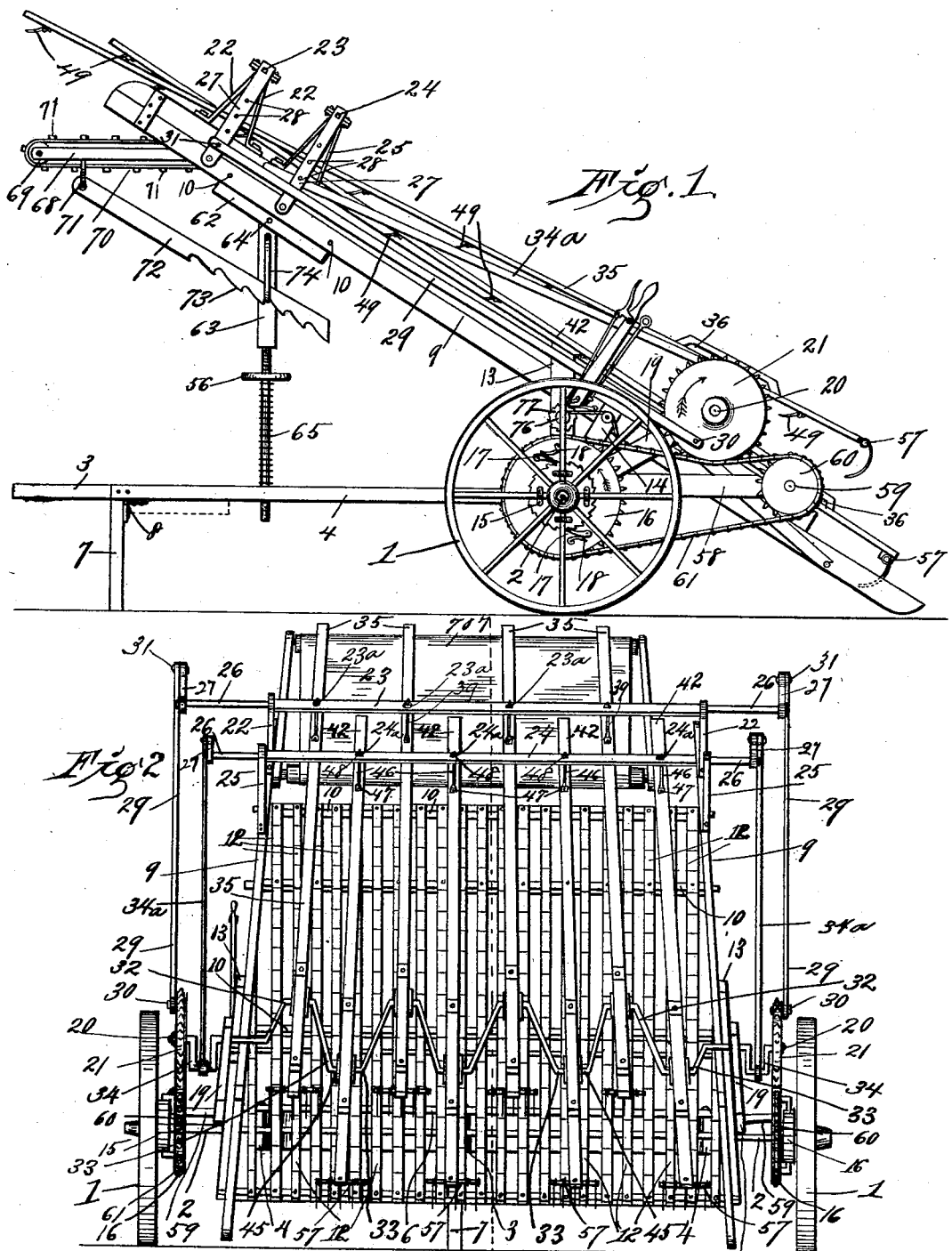
Witnesses
M. P. Smith
C. J. Thorpe
Inventor
Ethan W. Daily
By Hiram & Hiram
Att'ys (No Model.) 3 Sheets—Sheet 2.
E. W. DAILY.
HAY LOADER.
No. 507,109. Patented Oct. 24, 1893.
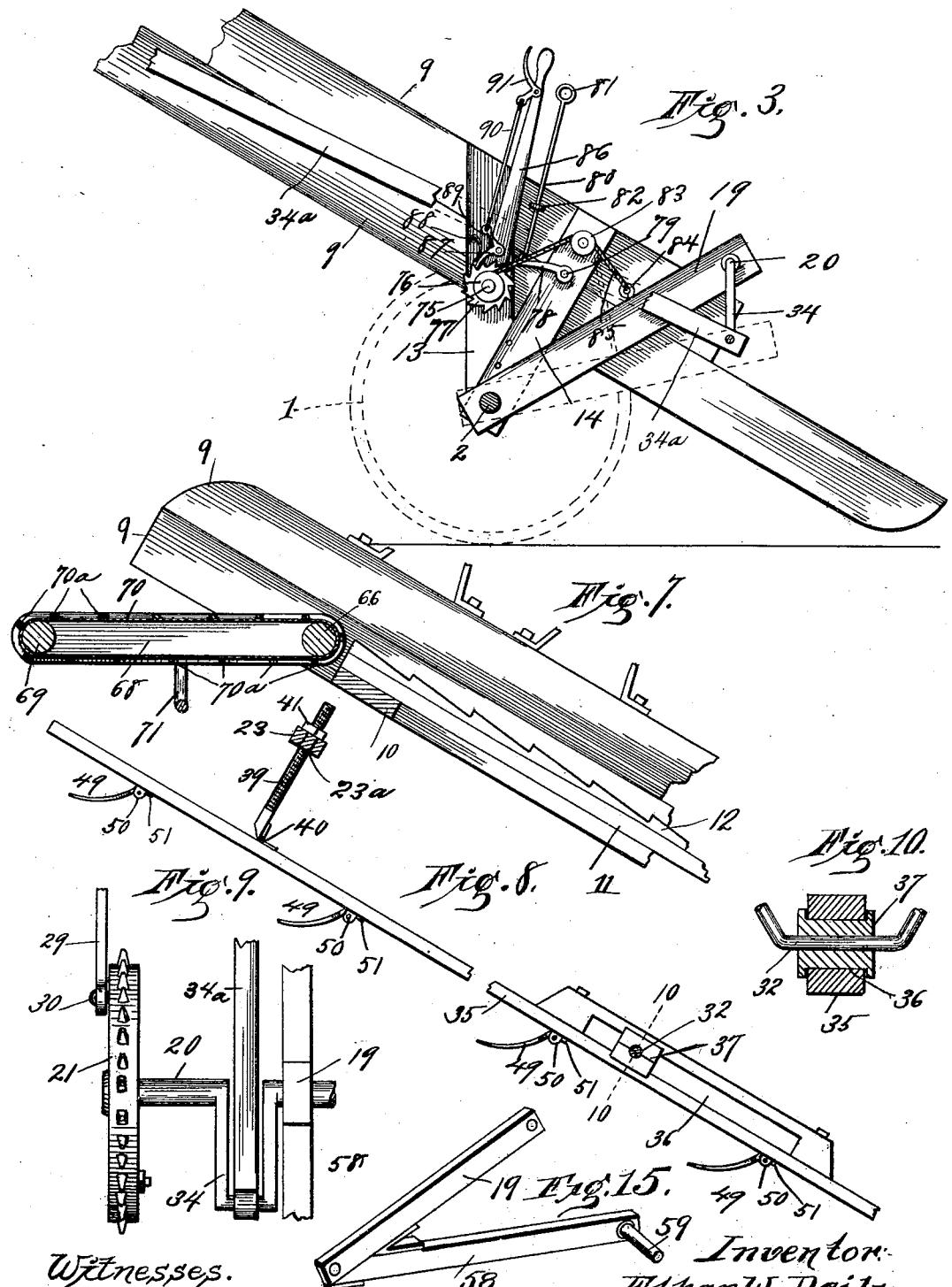

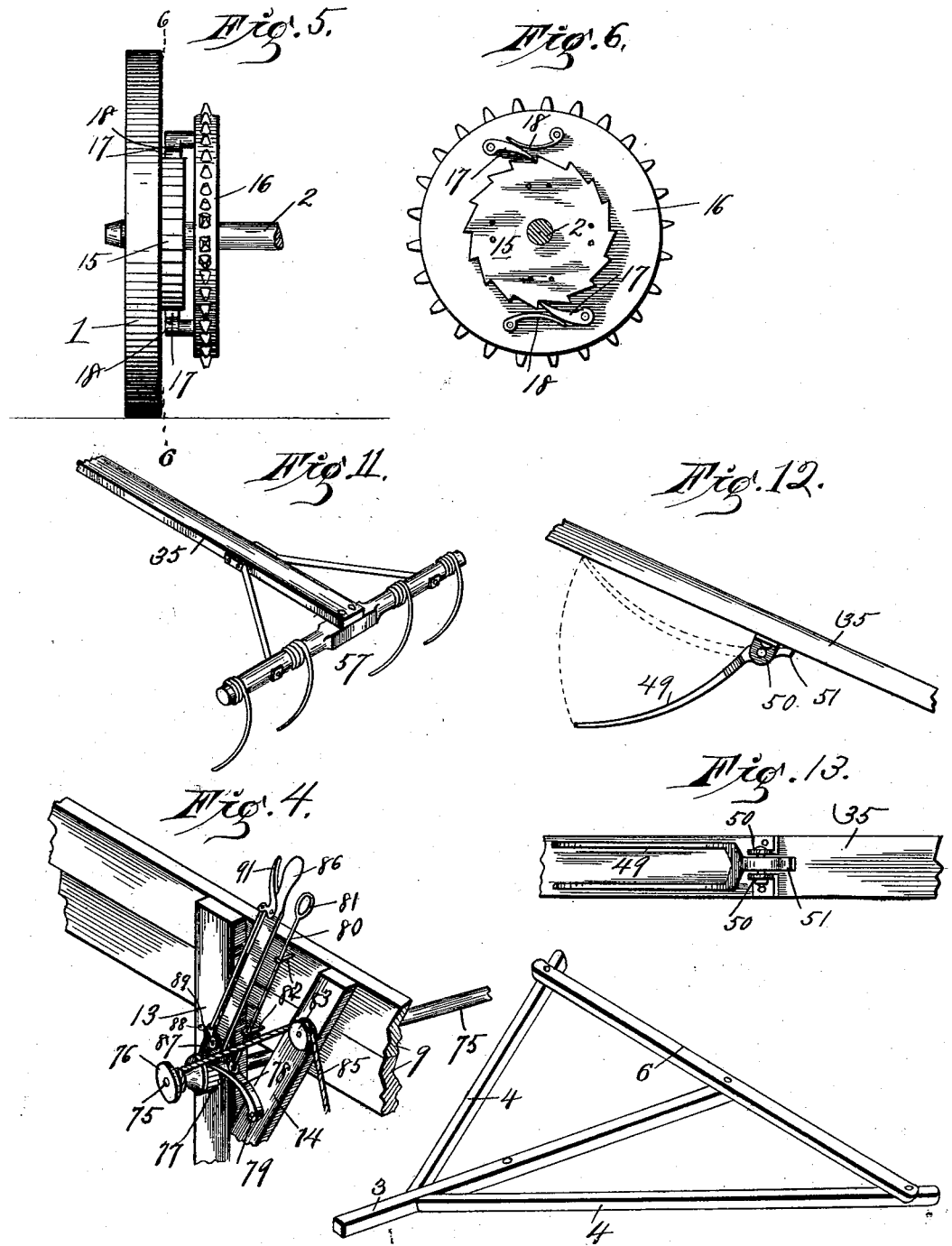

UNITED STATES PATENT OFFICE.

ETHAN W. DAILY, OF KANSAS CITY, KANSAS.

HAY-LOADER.

SPECIFICATION forming part of Letters Patent No. 507,109, dated October 24, 1893.

Application filed November 25, 1892. Serial No. 452,979. (No model.)

*To all whom it may concern:*

Be it known that I, ETHAN W. DAILY, of Kansas City, Wyandotte county, Kansas, have invented certain new and useful Improvements in Hay-Loaders, of which the following is a full, clear, and exact description, reference being had to the accompanying drawings, forming a part hereof.

My invention relates to improvements in that class of hay loaders, which are attached to the rear end of a wagon, and which as it is drawn across the field, gathers up the hay, and elevates and deposits it automatically upon the wagon, by a series of reciprocating bars; and also to produce a machine that will effectually gather up and elevate the short hay or grass as well as that of greater length; and also to produce a machine that is comparatively simple and inexpensive of construction and durable, effective and positive in operation.

To the above purposes my invention consists in certain peculiar and novel features of construction and arrangement, as will be fully described and claimed hereinafter.

In order that my invention may be fully understood, I will proceed to describe it with reference to the accompanying drawings, in which—

Figure 1. is a side elevation of a hay loader embodying my improvements. Fig. 2. is a rear elevation of the same. Fig. 3. is an enlarged view of the lower end of the machine showing the lever and its connections by which the rake end of the machine is raised or lowered. Fig. 4. is a perspective view of the lever mechanism shown in Fig. 3. Fig. 5. is an edge view of one of the driving wheels of the machine, showing the ratchet carried thereby, and the sprocket, carrying spring actuated pawls in engagement with the ratchet wheel. Fig. 6. is a vertical sectional view, taken on the line 6—6 of Fig. 5. Fig. 7. is a vertical longitudinal section of a portion of the machine, taken on the line 7—7 of Fig. 2. Fig. 8. is a detail side elevation of one of the reciprocating hay lifting bars. Fig. 9. is a rear view of a portion of one corner of the machine, showing the alternate relation of the pitman bars to each other. Fig. 10. is a sectional view, taken on the line 10—10 of Fig. 8. Fig. 11. is a view in perspective of the rear or lower end of one of the reciprocating bars, and showing secured thereto, the rake for gathering up the hay or grass. Fig. 12. is a detail view in side elevation of a portion of a reciprocating bar, showing at its under side the pivoted finger or fork, for elevating or carrying the hay to the wagon, after it is gathered by the rake. Fig. 13. is a bottom plan view of the same. Fig. 14, is a detail perspective view of the triangular frame of the hay loader, and Fig. 15, is a detail perspective view of one of the pivoted bars of the hay-loader, and showing the stub-axle carried thereby.

In the drawings,—1 designates the drive and supporting wheels mounted loosely on the opposite ends of the axle 2.

A triangular and horizontally arranged frame work, is composed of the central and forwardly extending bar 3, and the convergent side bars 4—4, the forward ends of which are secured to the opposite sides of the middle bar 3, and the rear ends of said bars are journaled loosely and pivotally upon the axle 2, and are braced laterally by the cross bar 6, at their rear ends.

The forward and projecting end of the middle bar 3, forms the tongue of the machine, and is attached to the rear end of a wagon in the usual manner. A supporting leg 7, is hinged at its upper and rear edge at 8, to the under side of the middle bar 3, a suitable distance from its forward end, and is adapted to be folded rearwardly to the position shown in dotted lines Fig. 1, when the loader is being drawn from place to place.

The upwardly inclined rectangular frame of the machine, is composed of the side bars 9, cross-bars 10, which connect and brace said side bars at their lower edges and a suitable distance apart, and longitudinally extending bars 11, which are secured upon the cross-bars 10, and from the slatted bottom of the frame work. These bars 11 are provided with the ratchet bars 12 secured upon their upper sides, the upper surface of said teeth being inclined upwardly and forwardly. These side bars 9, are provided at their outer sides, and near their rear ends with the downwardly extending and convergent brace and supporting bars 13 and 14 which are bolted or otherwise suitably secured together near their lower ends, and the projecting ends of the bars 14 are pivotally mounted upon the axle 2, near its opposite ends.

Rigidly secured to the inner side of the wheels 1 are the ratchet pinions 15; and rigidly mounted upon the axle, adjacent to the inner sides of the ratchet pinions, are the master sprocket wheels 16, which are each provided on its outer face with the diametrically opposite pawls 17 which are held in engagement with the teeth of the ratchet pinion by presser springs 18, secured to the outer faces of said sprocket wheels.

Pivotally mounted at their lower ends on the axle 2, adjacent to the inner side of the sprocket wheels 16 are the rearwardly and upwardly inclined bars 19, the upper ends of which project above the upper edge of the side bars 9 of the rectangular frame-work, which has pivotally supported therein, near its opposite ends the crank shaft 20, which carries at its outer ends the large sprocket wheels 21—21.

Erected perpendicularly from the upper edges of the side bars 9, and near their upper ends are the brackets 22, and the transversely extending rock-shaft 23, is journaled thereon near its opposite ends. A second rock-shaft 24, is journaled transversely on the perpendicularly erected brackets 25, which are also secured to the upper edges of the side bars 9, a suitable distance in rear of brackets 22. The bars 23 and 24 are each provided with extended ends 26 which project from opposite sides of the frame-work, and are also provided with apertures 23ᵃ and 24ᵃ. At the outer ends of these ends 26 are the pendent rock-arms 27, which are provided with a number of openings or apertures 28. Pitman rods 29 are connected pivotally at one end to the sprocket wheels 21—21 by bolts 30, and bolts 31 are passed through the opposite ends to the pitman rods 29 and through one of the apertures of the forward rock-arms 27. The crank shaft 20 is provided with a series of crank sections or arms 32, and a second series of crank sections or arms 33, each section or arm 32 being oppositely disposed from its adjacent section or arm 33. The shaft 20 is further provided at the inner side of each wheel 21, with a crank section or arm 34, which extends diametrically opposite to the pivotal point of the rear end of the pitman rods 29 and the sprocket wheels 21, the object of which will be hereinafter explained. Pitman rods 34ᵃ pivotally connect the crank-arms 34 and the rear pair of rock-arms 27.

A number of reciprocating bars 35, are provided with an enlargement near their rear ends, which are provided with the elongated apertures or longitudinally extending slots 36, in which are mounted to slide longitudinally the boxes 37, in which are journaled loosely the cross-bars of the crank-sections or arms 32, of crank-shaft 20. The forward ends of these bars, project beyond the front and upper end of the hay-loader, and above the rear end of the wagon, when the machine is coupled thereto, and have hinged to their upper sides, at 40, the lower ends of the vertically adjustable bars 39, the upper ends of which project upwardly through the apertures 23ᵃ and have a retaining nut 41 on their upper ends. A number of reciprocating bars 42, are also provided with enlargements near their rear ends, which are each provided with an elongated aperture or longitudinally extending slot 36, in which is mounted to slide longitudinally a bearing box 37, in which are loosely journaled the cross-bars 45, of the crank-sections or arms 33 of the crank shaft 20. The forward ends of the reciprocating bars 42, also project beyond the front and upper end of the machine, and above the rear end of the wagon, when the machine is coupled thereto, and have hinged to their upper sides at 47, the lower ends of the vertically adjustable bars 46, the upper ends of which project upwardly through the apertures 24ᵃ of the rock-shaft 24, and have retaining nuts 48 on their upper ends. These longitudinally reciprocatory bars 35 and 42 are provided at suitable distances apart, with depending and forwardly curving forks or fingers 49, the cross-bar of which is journaled in bearings 50 at the under side of the bars 35 and 42, and have projecting rearwardly therefrom the stop arm 51, which is adapted to bear against the under side of said bars and limit the rearward movement of the said forks or fingers. It will be seen that when the crank-shaft is operated the reciprocating bars 35 and 42 will be moved forwardly and rearwardly alternately, and the pitman rods 29 and 34ᵃ, will also be actuated alternately.

Secured transversely of the rear end of each reciprocatory bar 35 and 42, is the usual hay rake 57.

Secured to the pivotal bars 19 at their forward ends are the bars 58, having a stub axle 59, projecting outwardly therefrom near its rear end on which is journaled loosely the sprocket pinion 60, which is located rearwardly of the sprocket wheel 21. An endless chain 61 connects the sprocket pinion 60 with the sprocket wheel 16 mounted upon the axle 2; the said chain also engaging the teeth of the intermediately located sprocket wheel 21, to actuate the same, and the reciprocating bars for elevating the hay, in a direction opposite to the direction of revolution of the carrying wheels.

A longitudinally extending bar 62 is secured at its opposite ends at the forward end of the rectangular frame work, to the front pair of cross-bars 10, and has the upper end of a vertically arranged bar 63 pivoted thereto at 64. The lower portion of the bar 63 is formed cylindrical and is externally screw-threaded, and the lower end thereof projects loosely through an opening in the bar 3, of the triangular and horizontally arranged framework. A hand wheel 56 engages the screw-threaded portion of the bar 63, and a spiral resistance spring 65 surrounds said bar, and is interposed between the hand wheel and the upper side of the middle bar 3.

The rear or lower ends of the side bars 9, rest upon the ground in rear of the driving wheels, and in case the rear end of the machine, during its travel, strikes a rock or other obstruction in its path, the body-portion of the machine will be pivotally operated; the rear end rising and the front end moving downward, the resistance spring yielding sufficiently to allow of said movement. Immediately, however, the obstruction is passed, the spring exerts its upward pressure and returns the body-portion of the machine to its original position. This spring also forms a cushion for the machine when passing over rough or uneven ground, and thereby prevents a great deal of the jolting and racking the machine would undergo if not provided with the spring.

Extending transversely of the machine in advance of the front ends of the slatted bottom thereof, is a roller 66, the opposite ends of which are journaled in the side walls 9 of the frame; forwardly extending and parallel side bars 68, are pivotally secured at their rear ends upon the transverse roller 66 adjacent to the inner sides of the walls 9, and a roller 69 similar to the roller 66 is journaled at its opposite ends in the forward ends of the side bars 68. An endless apron or belt 70 connects the rollers 66 and 69, and is provided with the usual transverse strips 70$^a$. A bail 71 depends from the middle of the side bars 68 and the forward and upper end of an adjustable bar 72, pivotally engages the cross bar of the bail and is provided at its under side with the teeth 73, one or the other of which engages the lower horizontal arm of a loop 74, projecting outwardly from the side of the upper portion of the vertically arranged bar 63; this arrangement it will be seen allows of the vertical adjustment of the outer or free end of the endless apron or belt frame.

I will now proceed to describe the mechanism, for raising or lowering the rear or rake end of the machine, when desired: A shaft 75 extends transversely of and under the inclined frame work, and is journaled near its opposite ends in the oppositely disposed side bars 13, a suitable distance from their lower ends, and a drum or spool 76 is rigidly mounted on the projecting ends of said shaft, and one of said drums or spools carries at its inner end a ratchet wheel 77, one of the teeth of which is always engaged by the gravity pawl 78, pivoted at 79 to the bar 14. A rod 80 has a hand loop 81 at its upper end, and is connected at its lower end to the pawl 78; suitable guide loops 82, project from the sides 9 of the frame-work, and engage the rod 80. Pivotally supported at the upper end of the bars 14 at each side of the machine is a guide pulley 83, and an eye or loop 84, is secured to the upper side of each bar 19 a slight distance rearward of and below said pulleys, and one end of the cables or chains 85 are secured to the eyes or loops, and passing over the pulleys 83 extend forwardly over and are secured to the drums or spools 76. On the side of the machine adjacent to the pawl 78, a lever 86 is pivoted at its lower end on the shaft 75, at the inner end of the drum or spool, and has a pawl 87 pivoted near its lower end, engaging the teeth of the ratchet wheel 77. A presser spring 88 secured to the bar 13, holds the pawl in engagement with the teeth of said ratchet, and the pawl is provided with a forwardly extending arm 89, to which is pivotally attached the lower end of a rod 90, the upper end of which is pivotally connected to the lower arm of a bell crank hand lever 91, which is pivotally supported at the upper end of the lever 86. To raise the rear or rake end of the machine, the lever 86, is grasped and forced forward, and the pawl at the lower end, engaging the teeth of the ratchet 77, causes the revoluble movement of the shaft 75, and winds the cable or chain 82, upon the drums thereof, which lifts or elevates the rear end of the bars 19, and therefore the rear end of the reciprocating bars and pitman rods supported by said bars 19; when the rear or rake end of the lifting mechanism has been sufficiently elevated the gravity pawl 78, prevents the backward revolution of the drum or spool, and therefore holds the mechanism at the desired elevation.

When it is desired to lower the rear end of the mechanism the hand loop 81 or rod 80 is grasped; the rod is then pulled upwardly, and disengages the pawl 78 from its connection with the ratchet wheel 77; the hand lever 91 is then grasped, and the pawl is lifted from engagement with the ratchet wheel 77 allowing the rear end of the lifting mechanism to descend by gravity to the position desired, when the hand rod and lever is released and the pawls thereof immediately lock the mechanism in the desired position.

The arrangement of a revoluble through shaft, carrying a winding drum at each side of the machine provides for the lifting or lowering of the rear end of the machine, at one operation and therefore insures an evenness of movement of the entire mechanism of the machine, and thus obviates the necessity of a ratchet on each side, as used in the ordinary machine, which when not set exactly aright, raises the machine higher upon one side than the other, and causes a twisting movement of the parts when heavy loads are elevated, which is liable to break or rack the machine.

The general operation of the device is as follows: As the loader is drawn forward, the ratchet carried by the driving wheels causes the revolution of the master sprockets and the axle, and through the medium of the endless chain 61, the operation of the large sprocket wheel 21, which causes the operation of the crank shaft 20 thereof, and the operation of the pitman rods and rock-shafts and of the reciprocating bars. It will be seen that the slots near the rear end of said bars, allow of a horizontally elliptical movement, thus giving the rakes at the rear end thereof, an extended sweep on the surface of the ground and allowing a large quantity of hay and grass to be gathered at each stroke. As is well known, short grass gathered up by the rakes is difficult to elevate and deposit upon the wagon with the ordinary arrangement of the reciprocating bars; now with my bars, being provided with a series of pivotally carried pendent fingers or forks, and the bottom longitudinal bars 11 being also provided with ratchet bars 12 thereon, the short grass is elevated and deposited upon the wagon, as effectually as the longer grass or hay. On the back stroke of the pitman bars the fingers fold forwardly and upwardly against the bottom of the said bars, and therefore do not tend to draw the hay or grass with them, as would be the case were they stationary. It will be observed also, that the ratchet-bars, due to the forward disposition of their teeth, do not resist the upward movement of the hay or grass as would be the case were teeth of other disposition used. The connection of the reciprocating bars, with the rock-shafts at the upper end of the frame-work, allows the said bars to automatically adjust themselves to the quantity of hay, passing between the lower side of said bars, and the bottom of the frame-work. The hay or grass is pushed upon the apron or belt, which is first adjusted to the inclination desired, causing said belt to travel around the rollers and feed or deposit the hay or grass upon the wagon. As the load in the wagon increases in height, the apron or belt can be adjusted vertically. There is a great convenience in the traveling apron or belt, because in windy weather, it continually feeds the grass or hay upon the wagon, and does not allow it to accumulate or collect upon said belt; such accumulation having a tendency to overbalance the machine.

From the above description it will be seen that I have produced a comparatively simple and effective machine, which will elevate and deposit upon a wagon, short as well as long grass or hay; and also a machine that is durable of construction and positive in action.

Having thus described my invention, what I claim as new, and desire to secure by Letters Patent, is—

1. A hay-loader, comprising an axle, a pair of wheels mounted upon opposite ends of said axle, and a horizontally arranged frame pivoted at its rear end upon the axle, a hinged supporting leg near the front end of said frame, an obliquely arranged frame work, having downwardly extending bars at each side pivotally mounted upon the axle, and a vertically pendent bar near the front end of said frame work, having a reduced screw-threaded lower portion, a guide opening in the horizontally arranged frame, a hand wheel engaging said screw-threaded portion, and a resistance spring interposed between the hand wheel and the lower horizontally arranged frame, substantially as described.

2. A hay-loader, comprising an axle, a wheel journaled upon each end of said axle, a horizontally arranged frame pivotally supported at its rear end upon said axle, and provided with a vertical opening therethrough, an obliquely arranged frame-work having downwardly extending bars at each side, pivotally mounted upon the axle, and a vertically pendent bar near the front end of said frame work, having a reduced and screw-threaded lower portion, passing through the guide opening in the lower and horizontal frame, and also having a loop thereon, a hand wheel engaging said screw-threaded portion a resistance spring interposed between the hand wheel and the upper surface of the horizontal frame, and an endless apron or belt frame pivotally mounted at its rear end, in the front end of the obliquely arranged frame-work, and having a bail depending from the middle of the side bars thereof, and a toothed bar pivotally engaging the cross-bar of the bail and the loop on the vertically arranged bar at the front end of the frame-work, substantially as described.

3. A hay loader, comprising an axle, a pair of wheels mounted upon each end of said axle, a pair of bars pivotally mounted upon the said axle, a crank shaft supported in the upper end of said bars and formed with a number of oppositely disposed and alternately arranged crank-sections or arms, and having sprocket wheels thereon and a number of reciprocatory slotted rake-bars mounted upon said crank-sections or arms, and adapted to operate alternately in series, and a pair of rock-shafts having arms, and pitman bars connecting said rock-arms to the sprocket-wheels and to the crank-shaft, substantially as described.

4. A hay-loader, comprising an axle, a pair of wheels mounted upon opposite ends of said axle, a pair of bars pivotally mounted at their lower ends upon said axle, a crank-shaft mounted in the upper ends of said bars, and provided with two series of crank-sections or arms, each section or arm of one series being oppositely disposed and alternately arranged relative to the adjacent section or arm of the other section, and reciprocating rake-bars loosely mounted upon said crank sections or arms, a sprocket carried upon each end of the crank-shaft, an inclined frame work, having downwardly extending side bars, pivotally mounted upon the axle, a pair of transversely arranged rock-shafts at the upper end of the inclined frame work, having extended ends, pendent rock-arms secured to the ends of the rock-shafts, and pitman rods pivotally connecting the pendent rods and the sprocket wheels carried by the crank-shaft, and the crank-sections or arms adjacent to the inner side of said sprocket wheels, a number of openings in said rock-shafts, and adjustable rods passing through said openings, and having retaining nuts upon their projecting ends, and hinged at their lower ends to the reciprocatory rake-bars, substantially as described.

5. In a hay-loader, the combination with a wheeled framework, a pair of rock-shafts mounted thereon having openings and rock-arms, and bars pivotally supported at each side of said framework, and carrying a crank-shaft, sprocket-wheels mounted upon said shaft, and pitmen pivotally connecting said rock-arms to the sprocket-wheels and to the crank-shaft, of a series of slotted rake-bars, and sliding boxes therein embracing the crank-shaft, and bars pivoted to the rake-bars and adjustable through the openings of the rock-shafts, substantially as set forth.

6. In a hay loader, the combination with an axle and carrying wheels mounted thereon, and an inclined frame pivotally mounted upon said axle, and ratchet-wheels secured to the carrying wheels, and master-sprockets mounted rigidly upon the axle and having spring-actuated pawls engaging the ratchet-wheels, and a pair of bars pivotally mounted upon the axle and carrying a crank-shaft at their upper ends, and sprocket-wheels mounted rigidly upon said crank-shaft, and reciprocatory rake-bars also carried loosely upon said crank-shaft, and bars secured to and projecting rearwardly from the pivoted bars and carrying sprocket-pinions, and endless chains passing around the master sprocket-wheels and the sprocket-pinions, and engaging intermediately the sprocket-wheels of the crank-shaft, of a shaft having drums, and cords suitably guided connecting said drums and the pivoted bars, and a ratchet-wheel carried by one of said drums, and a lever, and a pawl carried thereby, and engaging said ratchet, so that as the lever is operated the drum-shaft will be rotated to pivotally operate the bars carrying the crank-shaft, and also to raise the bars carrying the sprocket-pinions so that the chains will always be in engagement with the sprocket-wheels of said crank-shaft, substantially as set forth.

7. In a hay-loader, the combination with an axle, and wheels mounted thereon, an inclined framework having depending side bars pivotally mounted at their lower ends upon the axle, and a pair of bars pivotally mounted upon the axle, and a crank-shaft also mounted in the upper ends of said pivotal bars and reciprocatory rake-bars loosely carried by the crank-shaft, and sprocket-wheels carried rigidly upon said crank shaft, of a shaft extending transversely of and under the inclined framework and journaled near its opposite ends in the depending side-bars thereof, drums mounted rigidly upon the projecting ends of the shaft, guide-pulleys carried by the framework, and cords passing over said pulleys and secured at their opposite ends to the drums and the pivotal bars mounted upon the axle, and a ratchet-wheel carried by one of the drums, and a lever loosely mounted upon the shaft of the drums, a spring-actuated pawl carried by the lever and adapted to engage the ratchet-wheel and a gravity pawl pivotally carried by the framework and also engaging the ratchet wheel, and a hand-rod connected to said pawl, all arranged substantially as and for the purpose set forth.

8. A hay-loader, comprising an axle, wheels journaled on the opposite ends of said axle, an inclined frame work pivotally mounted upon said axle, rock shafts supported near the front end of said frame-work, a pair of bars pivotally supported upon the axle, a crank-shaft journaled near its opposite ends in said bars, sprocket wheels secured upon the opposite ends of the said crank-shaft, a pitman connecting said wheels with one of the rock-shafts, and a pitman connecting the crank-shaft with the other rock-shaft, and a revoluble shaft carried by the pivotal supporting bars of the inclined framework, a drum or spool carried upon each end of said shaft, guide pulleys also carried by the framework, and cables or chains passing over said pulleys and secured at their opposite ends to the drums or spools, and the pivotal bars carrying the crank-shaft, and a ratchet carried by one of the drums, and a lever, having a pivoted and spring actuated pawl engaging said ratchet, and a hand rod, and a pawl connected to said hand rod, and engaging the teeth of the ratchet, substantially as described.

In testimony whereof I affix my signature in the presence of two witnesses.

ETHAN W. DAILY.

Witnesses:
MAUD FITZPATRICK,
M. P. SMITH.